United States Patent [19]

Murakami et al.

[11] Patent Number: 4,499,239

[45] Date of Patent: Feb. 12, 1985

[54] RESIN COMPOSITION FOR POWDER COATING

[75] Inventors: Yoichi Murakami, Osaka; Akio Shoji, Kishiwada; Shoichiro Takezawa, Sakai; Noboru Ishikawa, Izumi-ohtsu; Toshiaki Morita, Sakai, all of Japan

[73] Assignee: Dainippon Ink and Chemicals, Inc., Tokyo, Japan

[21] Appl. No.: 247,768

[22] Filed: Mar. 26, 1981

[30] Foreign Application Priority Data

Mar. 31, 1980 [JP] Japan .................................. 55-40471

[51] Int. Cl.$^3$ ............................................. C08F 8/00
[52] U.S. Cl. .................................. 525/111; 525/166; 525/176
[58] Field of Search ......................... 525/176, 111, 166

[56] References Cited

U.S. PATENT DOCUMENTS

| | | | |
|---|---|---|---|
| 3,857,905 | 12/1974 | Blackley | 525/166 |
| 3,932,320 | 1/1976 | Camelon | 525/176 |
| 3,932,349 | 1/1976 | Camelon | 525/176 |
| 3,978,153 | 8/1976 | Sato | 525/166 |
| 3,998,905 | 12/1976 | Labana | 525/166 |
| 4,012,559 | 3/1977 | Fujioka | 525/176 |
| 4,246,368 | 1/1981 | Murase | 525/176 |
| 4,284,540 | 8/1981 | Iida | 525/176 |
| 4,320,207 | 3/1982 | Watanabe | 525/176 |

FOREIGN PATENT DOCUMENTS

| | | |
|---|---|---|
| 1381262 | 12/1970 | United Kingdom . |
| 1384038 | 6/1973 | United Kingdom . |
| 1509043 | 4/1975 | United Kingdom . |

*Primary Examiner*—Melvyn I. Marquis
*Attorney, Agent, or Firm*—Sherman & Shalloway

[57] ABSTRACT

A resin composition for powder coating, said composition consisting essentially of (A) 60 to 97% by weight of a polyester resin having an acid value of 15 to 200 mgKOH/g and a softening point of 80° to 150° C., and (B) 3 to 40% by weight of a glycidyl-containing acrylic polymer unmodified or modified with a monobasic acid.

15 Claims, No Drawings

RESIN COMPOSITION FOR POWDER COATING

This invention relates to a novel and useful resin composition for powder coating. More specifically, it relates to a composition consisting essentially of a specified polyester resin and a glycidyl-containing acrylic polymer optionally modified with a monobasic acid.

Powder coating compositions comprising a polyester resin having free carboxyl groups and polyepoxy compound such as triglycidyl isocyanurate have been widely utilized because they give coatings having superior mechanical strength, adhesion and corrosion resistance. But they have the defect of possessing insufficient melt flowability, and of giving coated films having poor smoothness or poor weatherability or containing foams resulting from the air which remains unescaped from the powder coating composition.

The present inventors have made extensive investigations in order to remedy the aforesaid defects, and found that when an acrylic polymer having a specified molecular weight and derived from (β-methyl)glycidyl (meth)acrylate (to be referred to as a glycidyl-containing acrylic polymer) is incorporated as a curing agent for a polyester resin, there can be obtained a resin composition for powder coating capable of giving a coated film having superior surface characteristics such as smoothness, gloss and brightness and outstanding weatherability.

Thus, according to this invention, there is provided a resin composition for powder coating consisting essentially of (A) 60 to 97% by weight, preferably 70 to 90% by weight of a polyester resin having an acid value of 15 to 200 mg KOH/g and a softening point, determined by the ball-and-ring method, of 80° to 150° C. and (B) 3 to 40% by weight, preferably 10 to 30% by weight, of a glycidyl-containing acrylic polymer unmodified or modified with a monobasic acid.

The polyester resin (A) preferably has an acid value of 20 to 70 mg KOH/g and a softening point of 100° to 130° C. It may be of a branched structure or a linear structure.

There is no particular limitation on the production of the polyester resin (A), and it may be prepared by any known method of preparation. The starting acid and alcohol components may be known conventional dibasic and polybasic acids, and dihydric and polyhydric alcohols, respectively. Typical examples of the acid component include terephthalic acid, isophthalic acid, phthalic acid, methylterephthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, methylhexahydrophthalic acid, and the anhydrides thereof. Typical examples of the alcohol component include ethylene glycol, propylene glycol, 1,3-butanediol, 1,4-butanediol, 1,6-hexanediol, neopentyl glycol, isopentyl glycol, bishydroxyethyl terephthalate, hydrogenated bisphenol A, an ethylene oxide adduct of hydrogenated bisphenol A, a propylene oxide adduct of hydrogenated bisphenol A, trimethylolethane, trimethylolpropane, glycerol, pentaerythritol and 2,2,4-trimethylpentane-1,3-diol. Monoepoxy compounds can also be used as one glycol component.

The suitable number average molecular weight of the polyester resin (A) is 1,000 to 10,000, preferably 2,000 to 5,000.

The average number of carboxyl groups per molecule of the polyester resin (A) is from 1.2 to 3.0, preferably 1.5 to 1.9 for excellent film smoothness and gloss.

The glycidyl-containing acrylic polymer (B) is a polymer obtained by using (β-methyl)glycidyl (meth)acrylate as an essential starting material. It may be unmodified, or modified with a monobasic acid.

The glycidyl-containing acrylic polymer (B) is obtained in a customary manner, for example, from 20 to 100% by weight, preferably 40 to 80% by weight, of at least one (β-methyl)glycidyl (meth)acrylate selected from glycidyl acrylate, glycidyl methacrylate, β-methyl glycidyl acrylate and β-methyl glycidyl methacrylate and 0 to 80% by weight, preferably 20 to 60% by weight, of another vinyl monomer.

The glycidyl-containing acrylic polymer (B) modified with a monobasic acid is obtained, for example, by using 20 to 99% by weight, preferably 40 to 78% by weight, of at least one (β-methyl)glycidyl (meth)acrylate selected from glycidyl acrylate, glycidyl methacrylate, β-methyl glycidyl acrylate and β-methylglycidyl methacrylate, 0 to 60% by weight, preferably 20 to 50% by weight, of another vinyl monomer, and 1 to 20% by weight, preferably 2 to 10% by weight, of a monobasic acid. Modification of the glycidyl-containing acrylic polymer with a monobasic acid is carried out, for example, by a method which comprises reacting the (β-methyl)glycidyl (meth)acrylate with the monobasic acid to form an ester, and polymerizing the ester; a method which comprises (co)polymerizing (β-methyl)glycidyl (meth)acrylate (and the other vinyl monomer), and then esterifying the product with the monobasic acid; and a method which involves such polymerization and esterification simultaneously. The last-mentioned method which comprises polymerizing the (β-methyl)glycidyl (meth)acrylate and the other vinyl monomer in the presence of the monobasic acid is especially suitable. A solution-polymerization method is especially recommended as the type of polymerization reaction because it permits easy control of molecular weight.

Especially preferred as the (β-methyl)glycidyl (meth)acrylate is β-methylglycidyl methacrylate which is used either alone or in combination with glycidyl methacrylate.

Typical examples of the other vinyl monomer which may be used as a comonomer to be reacted with (β-methyl)glycidyl (meth)acrylate are styrene, (meth)acrylic acid esters, fumaric acid diesters, acrylonitrile and acrylamide. Other vinyl monomers may be used which can be copolymerized with the (β-methyl)glycidyl (meth)acrylate. The (meth)acrylic acid esters, particularly methyl methacrylate and Cellosolve methacrylate, are preferred because of their good compatibility with the polyester resin (A). When a monomeric composition containing at least 50% by weight, preferably 70 to 100% by weight, of methyl methacrylate or Cellosolve methacrylate is used as the other vinyl monomer, there can be obtained a coated film which has especially superior brightness.

The monobasic acid is particularly useful as a component for increasing the compatibility of the component (B) with the polyester resin (A). It may be any of aromatic, aliphatic and alicyclic monobasic acids. From the standpoint of film smoothness, gloss and brightness, long-chain saturated aliphatic monobasic acids are especially preferred.

Examples of the monobasic acid are benzoic acid, p-tert-butylbenzoic acid, hydrogenated products of these benzoic acids, caprylic acid, lauric acid, myristic acid, palmitic acid, stearic acid, arachic acid, behenic acid, lignoceric acid, and isomers thereof with branched alkyl groups. Needless to say, polybasic acids which are esterified or etherified leaving only one carboxyl group may also be used as the monobasic acid.

For the purpose of this invention, the glycidyl-containing acrylic polymer (B) suitably has a number average molecular weight of 300 to 5,000, preferably 500 to 3,000, and an epoxy equivalent of 130 to 2,000, preferably 200 to 1,000. If the molecular weight of the acrylic polymer (B) is less than 300, the resulting coating film has insufficient mechanical strength, and smoke may occur during baking of the coated film. If the molecular weight of the acrylic copolymer (B) exceeds 5,000, the coated film has poor smoothness and brightness, and the compatibility between the resins is poor so that the crosslinking reaction of the coating does not sufficiently proceed and moreover the coated film has poor strength.

If the amount of the (β-methyl)glycidyl (meth)acrylate is less than 20% by weight, the resulting acrylic polymer (B) has poor compatibility and insufficient reactivity, with the polyester resin (A) and therefore cannot give a good cured film.

If the amount of the monobasic acid is less than 1% by weight, no effect of modification can be expected, and if it exceeds 20% by weight, the resulting coated film has poor weatherability.

A powder coating composition having improved performance can be obtained by adding as auxiliary components 0.5 to 20 parts by weight of (C) an aliphatic dibasic acid, (D) a polyepoxy resin, and/or (E) a carboxyl-containing vinyl polymer to 100 parts by weight of the polyester resin (A) and the glycidyl-containing acrylic polymer (B) combined.

The aliphatic dibasic acid (C) is represented by the general formula

HOOC—R—COOH wherein R represents a linear or branched alkylene group having 1 to 20 carbon atoms. Typical examples of the aliphatic dibasic acid (C) are succinic acid, adipic acid, pimelic acid, suberic acid, azelaic acid, sebacic acid, decanedicarboxylic acid and brassylic acid. Those having larger carbon numbers have the advantage of producing the effect intended by this invention markedly and generating little smoke during baking. The amount of the aliphatic dibasic acid (C) is suitably 0.5 to 20 parts by weight, preferably 1 to 10 parts by weight, per 100 parts by weight of the polyester resin (A) and the acrylic polymer (B) combined. If it is less than 0.5 part by weight, the component (C) does not bring about an effect of improving film appearance characteristic such as smoothness, gloss and brightness. If it is larger than 20 parts by weight, the mechanical strength of the coated film is reduced.

The polyepoxy resin (D) serves to improve the corrosion resistance and mechanical strength of the coated film, and denotes a resin having at least 2, preferably 2 to 3, epoxy groups per molecule and an epoxy equivalent of 80 to 2,000, preferably 100 to 1,000. Known epoxy resins may be used, and typical examples include diglycidyl ethers of bisphenols and glycidyl ester ethers of hydroxybenzoic acid; polyglycidyl ethers of polyhydric alcohol, such as ethylene glycol diglycidyl ether or trimethylol propane triglycidyl ether; glycidyl esters of dibasic acids, such as diglycidyl terephthalate; alicyclic polyepoxides such as diglycidyl ethers of hydrogenated bisphenols or (3,4-epoxy-6-methylcyclohexyl)-methyl ester of 3,4-epoxy-6-methyl-cyclohexanecarboxylic acid; and triglycidyl isocyanurate. The amount of the polyepoxy resin (D) is 0.5 to 20 parts by weight, preferably 1 to 5 parts by weight, per 100 parts by weight of the polyester resin (A) and the acrylic polymer (B) combined. The polyepoxy resin (D) suitably has a number average molecular weight of 300 to 5,000, preferably 500 to 3,000.

The carboxyl-containing vinyl polymer (E) serves to further improve film weatherability, hardness and stain resistance, and is obtained by copolymerizing a carboxyl-containing vinyl monomer with another vinyl monomer in a customary manner. Preferably, it has an acid value of 10 to 200 mgKOH/g and a number average molecular weight of 300 to 10,000, especially preferably an acid value of 15 to 150 mgKOH/g and a number average molecular weight of 1,000 to 5,000. Typical examples of the carboxyl-containing vinyl monomer include acrylic acid, methacrylic acid, maleic acid, fumaric acid, itaconic acid and maleic anhydride. On the other hand, the other vinyl monomer copolymerizable with the vinyl monomer typically includes styrene, (meth)acrylic acid esters, acrylamide, acrylonitrile, and vinyltoluene. The amount of the carboxyl-containing vinyl polymer (E) is 0.5 to 20 parts by weight, preferably 2 to 10 parts by weight, per 100 parts by weight of the polyester resin (A) and the glycidyl-containing acrylic polymer (B) combined.

It is possible to incorporate further in the composition of this invention consisting of the components (A) and (B) and components (C), (D) and/or (E) as optional components, a known catalyst such as an amine, an imidazole or a metal soap to promote the crosslinking reaction, a polymer of a long-chain alkyl acrylate (such as 2-ethylhexyl acrylate polymer) to prevent occurrence of craters on a film surface or improve the smoothness of the film, a known flow control agent such as a silicone or a fluorine compound, a pigment or other known fillers.

A powder coating composition may be obtained by kneading the composition of this invention either as such or after incorporating the aforesaid various additives or fillers and then pulverizing the kneaded mixture. Other known methods may also be used to produce a powder coating composition from the composition of this invention.

The powder coating composition may be applied by known coating methods such as electrostatic coating, electrostatic spray coating or fluidized coating.

The coated film so prepared is baked by a conventional method to give a cured film having superior appearance represented by superior smoothness, gloss and brightness and outstanding weatherability.

The following Referential Examples, Comparative Examples, and Examples specifically illustrate the present invention. In these examples, all parts are by weight unless otherwise specified.

REFERENTIAL EXAMPLE 1

Preparation of polyester resin (A)

A mixture consisting of 2,049 parts of neopentyl glycol, 1,911 parts of dimethyl terephthalate and 1.1 parts of zinc acetate was gradually heated to 210° C. while removing the resulting methanol out of the reaction system. Then, 67 parts of adipic acid, 1,375 parts of terephthalic acid and 1.5 parts of dimethyltin oxide were added, and the mixture was heated to 240° C. over the course of 10 hours. The reaction mixture was then cooled to 180° C., and 330 parts of trimellitic anhydride was added to give a polyester resin having an acid value of 35, a softening point of 126° C. and a number average molecular weight of 3,000. The resulting polyester is designated as a "polyester resin (A-1)".

REFERENTIAL EXAMPLE 2

Preparation of polyester resin (A)

A mixture consisting of 951 parts of neopentyl glycol, 566 parts of ethylene glycol, 1,836 parts of dimethyl terephthalate and 1.8 parts of zinc acetate was gradually heated to 210° C. while removing the resulting methanol out of the reaction system. Then, 1,570 parts of isophthalic acid and 2 parts of dibutyltin oxide were added, and the mixture was heated to 240° C. over the course of 10 hours. The reaction was continued at this temperature to give a polyester resin having an acid value of 25, a softening point of 105° C. and a number average molecular weight of 3,700. The resulting polyester is designated as a "polyester resin (A-2)".

REFERENTIAL EXAMPLE 3

Preparation of polyester resin (A)

A mixture consisting of 1,517 parts of neopentyl glycol, 233 parts of 1,4-cyclohexanedimethanol, 1,569 parts of dimethyl terephthalate and 1.6 parts of zinc acetate was gradually heated to 210° C. while removing the resulting methanol out of the reaction system. Furthermore, 1,490 parts of terephthalic acid and 2 parts of dibutyltin oxide were added, and the mixture was heated to 240° C. over the course of 10 hours. The reaction was continued at this temperature to give a polyester resin having a number average molecular weight of 3,200, an acid value of 30 and a softening point of 108° C. The resulting polyester is designated as a "polyester resin (A-3)".

REFERENTIAL EXAMPLE 4

Preparation of glycidyl-containing acrylic polymer (B)

A mixture consisting of 80 parts of β-methylglycidyl methacrylate, 20 parts of methyl methacrylate, 1 part of t-butyl perbenzoate and 0.5 part of cumene hydroperoxide was added dropwise to 100 parts of xylene at 150° C. under pressure to perform polymerization. On removal of xylene, a polymer having a number average molecular weight of 1,500 was obtained. The resulting polymer is designated as a "polymer (B-1)".

REFERENTIAL EXAMPLE 5

Preparation of glycidyl-containing acrylic polymer (B)

A mixture consisting of 50 parts of β-methylglycidyl methacrylate, 50 parts of Cellosolve methacrylate and 2 parts of t-butyl perbenzoate was added dropwise to 100 parts of xylene at 155° C. to perform polymerization. On removal of xylene, there was a polymer having a number average molecular weight of 1,300 was obtained. The resulting polymer is designated as a "polymer (B-2)".

REFERENTIAL EXAMPLE 6

Preparation of glycidyl-containing acrylic polymer (B)

A mixture consisting of 10 parts of 3-methylglycidyl methacrylate, 40 parts of glycidyl methacrylate, 50 parts of methyl methacrylate, 1 part of tert-butyl perbenzoate and 0.5 part of cumene hydroperoxide was added dropwise to 100 parts of xylene at 150° C. under pressure. On removal of xylene, a polymer having a number average molecular weight of 1,500 was obtained. The resulting polymer is designated as a "polymer (B-3)".

REFERENTIAL EXAMPLE 7

Preparation of glycidyl-containing acrylic polymer (B)

A mixture consisting of 20 parts of β-methylglycidyl methacrylate, 30 parts of glycidyl methacrylate, 50 parts of Cellosolve methacrylate and 2 parts of tertbutyl perbenzoate was added dropwise to 100 parts of xylene at 155° C. to perform polymerization. On removal of xylene, a polymer having a number average molecular weight of 1,300 was obtained. The resulting polymer is designated as a "polymer (B-4)".

REFERENTIAL EXAMPLE 8

Preparation of glycidyl-containing acrylic polymer (B) modified with a monobasic acid A mixture consisting of 65 parts of β-methylglycidyl methacrylate, 30 parts of methyl methacrylate, 1 part of t-butyl perbenzoate and 0.5 part of cumene hydroperoxide was added dropwise to 100 parts of xylene and 5 parts of 2,2-diethylhexanoic acid at 150° C. under pressure to perform polymerization. On removal of xylene, a polymer having a molecular weight of 1,500 and an epoxy equivalent of 280 was obtained. The resulting polymer is designated as a "polymer (B-5)".

REFERENTIAL EXAMPLE 9

Preparation of glycidyl-containing acrylic polymer (B) modified with a monobasic acid A mixture consisting of 55 parts of β-methylglycidyl methacrylate, 40 parts of Cellosolve methacrylate and 2 parts of t-butyl perbenzoate was added dropwise to 100 parts of xylene and 5 parts of 2,2-diethylhexanoic acid at 155° C. to perform polymerization. On removal of xylene, a polymer having a number average molecular weight of 1,300 and an epoxy equivalent of 34.5 was obtained. The resulting polymer is designated as a "polymer (B-6)".

REFERENTIAL EXAMPLE 10

Preparation of carboxyl-containing vinyl polymer (E)

The same operation as in Referential Example 7 was repeated except that the starting mixture used in Referential Example 7 was replaced by a mixture consisting of 15 parts of methacrylic acid, 60 parts of styrene, 25 parts of n-butyl acrylate, 1 part of tert-butyl perbenzoate and 0.5 part of cumene hydroperoxide. A polymer having a number average molecular weight of 1,700 and an acid value of 95 mgKOH/g was obtained. The resulting polymer is designated as a "polymer (E-1)".

REFERENTIAL EXAMPLE 11

Preparation of carboxyl-containing vinyl polymer (E)

The same procedure as in Referential Example 7 was repeated except that the starting mixture of Referential Example 7 was replaced by a mixture consisting of 10 parts of acrylic acid, 50 parts of isobutyl methacrylate, 40 parts of ethyl methacrylate, 1.5 parts of tert-butyl perbenzoate and 0.5 part of cumene hydroperoxide. A polymer having a molecular weight of 2,000 and an acid value of 75 KOHmg/g was obtained. The resulting polymer is designated as a "polymer (E-2)".

EXAMPLE 1

Ninety parts of the polyester resin (A-1), 10 parts of the polymer (B-1), 50 parts of titanium dioxide and 1 part of Modaflow (a tradename for a flow control agent made by Monsanto Company, U.S.A.) were mixed, and kneaded by an extruder. The kneaded mixture was cooled, and pulverized to form a powder coating composition.

The powder coating composition was applied to a mild steel plate, and baked at 180° C. for 20 minutes to form a film having a thickness of 60 microns (it shoule be understood that unless otherwise specified, the thickness of the films obtained in the following Examples and Comparative Examples is 60 microns).

EXAMPLE 2

A coated film was obtained in the same way as in Example 1 except that the amount of the polyester resin (A-1) was changed to 80 parts, and 20 parts of the polymer (B-2) was used instead of 10 parts of the polymer (B-1).

The properties of the coated films obtained in Examples 1 and 2 are summarized in Table 1. It is seen that these coated films had superior appearance, mechanical strength and weatherability.

COMPARATIVE EXAMPLE 1

A coated film was prepared in the same way as in Example 1 except that a polymer having a molecular weight of 7,000 obtained from 25 parts of glycidyl methacrylate, 50 parts of methyl methacrylate and 25 parts of n-butyl acrylate in the same way as in Referential Example 4 was used instead of the polymer (B-1).

The resulting coated film had very poor appearance and mechanical strength as shown in Table 1.

TABLE 1

| | Example 1 | Example 2 | Comparative Example 1 |
|---|---|---|---|
| Smoothness | Good | Good | Orange peel |
| Gloss | 91 | 94 | 16 |
| Erichsen (mm) | >7 | >7 | <1 |
| Impact strength | 1 kg × 50 cm | 1 kg × 50 cm | 1 kg × 10 cm |
| Weatherability (retention of gloss after exposure for 500 hours to Sunshine Weather-O-meter) | 86% | 89% | — |

EXAMPLE 3

A coated film was prepared by repeating the same procedure as in Example 1 except that the amount of the polyester resin (A-1) was changed to 85 parts, and 15 parts of the polymer (B-5) was used instead of 10 parts of the polymer (B-1).

EXAMPLE 4

A coated film was prepared by repeating the same procedure as in Example 1 except that the amount of the polyester resin (A-2) was changed to 89 parts, and 11 parts of the polymer (B-5) was used instead of 10 parts of the polymer (B-1).

EXAMPLE 5

A coated film was prepared by repeating the same procedure as in Example 1 except that the amount of the polyester resin (A-1) was changed to 83 parts, and 17 parts of the polymer (B-6) was used instead of 10 parts of the polymer (B-1).

The properties of the coated films obtained in Examples 3 to 5 are shown in Table 2. It is seen that all of these coated films had superior appearance, mechanical strength and weatherability.

COMPARATIVE EXAMPLE 2

A polymer having a number average molecular weight of 7,000 was prepared in the same way as in Referential Example 8 except that a mixture consisting of 25 parts of glycidyl methacrylate, 50 parts of methyl methacrylate, 25 parts of n-butyl acrylate and 2 parts of azobisisobutyronitrile was used instead of the starting mixture used in Referential Example 8, 2,2-diethylhexanoic acid was not used, and the reaction temperature was changed to 90° C. A coated film was prepared in the same way as in Example 3 except that the resulting polymer was used instead of the polymer (B-5).

The coated film had very poor appearance and mechanical strength as shown in Table 2.

TABLE 2

| | Example 3 | Example 4 | Example 5 | Comparative Example 2 |
|---|---|---|---|---|
| Smoothness | Good | Good | Good | Orange peel |
| Gloss | 92 | 95 | 91 | 18 |
| Erichsen (mm) | >7 | >7 | >7 | <1 |
| Impact strength | 1 kg × 50 cm | 1 kg × 50 cm | 1 kg × 50 cm | 1 kg × 10 cm |
| Weatherability (gloss retention after exposure for 500 hours to Sunshine Weather-O-meter) | 85% | 88% | 83% | — |

EXAMPLE 6

A coated film was prepared by repeating the same procedure as in Example 1 except that the polyester resin (A-3) was used instead of the polyester resin (A-1), the polymer (B-3) was used instead of the polymer (B-1), and 3 parts of decanedicarboxylic acid was additionally used.

EXAMPLE 7

A coated film was prepared by repeating the same procedure as in Example 1 except that 85 parts of the polyester resin (A-3) was used instead of 90 parts of the polyester resin (A-1), 15 parts of the polymer (B-4) was used instead of 10 parts of the polymer (B-1), and 3 parts of decanedicarboxylic acid was additionally used.

As shown in Table 3 below, the coated films obtained in Examples 6 and 7 had excellent appearance.

TABLE 3

|  | Example 6 | Example 7 |
|---|---|---|
| Smoothness |  |  |
| (thickness 30 microns) | Good | Good |
| (thickness 60 microns) | Very good | Very good |

EXAMPLE 8

Ninety-three parts of the polyester resin (A-1), 7 parts of the polymer (B-1), 3 parts of triglycidyl isocyanurate, 50 parts of titanium dioxide and 1 part of "ACRONAL 4F" were mixed, and kneaded in an extruder. The kneaded mixture was cooled, and pulverized to form a powder coating composition.

Using the resulting powder coating composition, a coated film was prepared in the same way as in Example 1.

EXAMPLE 9

A coated film was prepared in the same way as in Example 8 except that the amount of the polyester resin (A-1) was changed to 84 parts, 16 parts of the polymer (B-2) was used instead of 7 parts of the polymer (B-1), and 5 parts of "Epiclon 3050" was used instead of 3 parts of triglycidyl isocyanurate.

EXAMPLE 10

A coated film was prepared in the same way as in Example 1 except that there was used a powder coating composition prepared from 93 parts of the polyester resin (A-2), 7 parts of the polymer (B-1), 3 parts of "Epiclon 3050", 1 part of carbon black, 10 parts of barium sulfate and 1 part of "ACRONAL 4F".

EXAMPLE 11

A powder coating composition was prepared in the same way as in Example 1 from 91 parts of the polyester resin (A-2), 9 parts of the polymer (B-2), 2 parts of hydroxybenzoic acid glycidyl ester ether, 1 part of "Epiclon 3050", 1 part of carbon black, 10 parts of barium sulfate and 0.1 part of 2-methylimidazole. The powder coating composition was applied and baked at 160° C. for 20 minutes.

The properties of the coated films obtained in Examples 8 to 11 are shown in Table 4. All of them had superior appearance, mechanical strength, weatherability and corrosion resistance.

COMPARATIVE EXAMPLE 3

A coated film was prepared in the same way as in Example 8 except that the polymer obtained in Comparative Example 1 was used instead of the polymer (B-1).

The resulting film, as shown in Table 4, had very poor appearance, mechanical strength and corrosion resistance.

TABLE 4

|  | Example 8 | Example 9 | Example 10 | Example 11 | Comparative Example 3 |
|---|---|---|---|---|---|
| Smoothness | Good | Good | Good | Good | Orange peel |
| Gloss | 91 | 94 | 95 | 92 | 16 |
| Erichsen (mm) | >7 | >7 | >7 | >7 | <1 |
| Impact strength | 1 kg × 50 cm | 1 kg × 50 cm | 1 kg × 50 cm | 1 kg × 50 | 1 kg × 10 cm |
| Weatherability (gloss retention after exposure for 500 hours to Sunshine Weather-O-meter) | 89% | 85% | 86% | 88% | — |
| Corrosion resistance (peel width of a crosscut after salt spraying for 500 hours) | <1 mm | <1 mm | <1 mm | <1 mm | >5 mm |

EXAMPLE 12

Seventy-eight parts of the polyester resin (A-1), 22 parts of the polymer (B-1), 10 parts of the polymer (E-1), 50 parts of titanium dioxide and 1 part of "ACRONAL 4F" were mixed, and kneaded in an extruder. The kneaded mixture was cooled, and pulverized to form a powder coating composition.

Using the resulting powder coating composition, a coated film was prepared in the same way as in Example 1.

EXAMPLE 13

A coated film was prepared in the same way as in Example 1 except that the amount of the polyester resin (A-1) was changed to 79 parts, 21 parts of the polymer (B-2) was used instead of 10 parts of the polymer (B-1), and 5 parts of (E-2) was used additionally.

EXAMPLE 14

A coated film was prepared by repeating the same procedure as in Example 1 except that a powder coating composition prepared from 76 parts of the polyester resin (A-2), 24 parts of the polymer (B-1), 5 parts of the polymer (E-1), 1 part of carbon black, 10 parts of barium sulfate and 1 part of "ACRONAL 4F" was used.

The properties of the coated films obtained in Examples 12 to 14 are summarized in Table 5. It is seen that all of these films had superior appearance, mechanical strength, weatherability, and corrosion resistance.

TABLE 5

|  | Example 12 | Example 13 | Example 14 |
|---|---|---|---|
| Smoothness | Good | Good | Good |
| Gloss | 86 | 85 | 88 |
| Erichsen (mm) | >7 | >7 | >7 |
| Impact strength | 500 g × 50 cm | 500 g × 50 cm | 500 g × 50 cm |
| Weatherability (retention of gloss after exposure for 500 hours to Sunshine | 92% | 91% | 94% |

TABLE 5-continued

| | Example 12 | Example 13 | Example 14 |
|---|---|---|---|
| Weather-O-meter) | | | |

What we claim is:

1. A resin composition for powder coating, said composition consisting essentially of
   (A) 60 to 97% by weight of a polyester resin having an acid value of 20 to 200 mgKOH/g and a softening point of 80° to 150° C., and
   (B) 3 to 40% by weight of a glycidyl-containing acrylic polymer which is compatible with and reactive with the polyester resin (A).

2. The composition of claim 1 wherein the glycidyl-containing acrylic polymer (B) is obtained from 20 to 100% by weight of at least one compound selected from the group consisting of glycidyl acrylate, glycidyl methacrylate, β-methylglycidyl acrylate and β-methylglycidyl methacrylate, and 0 to 80% by weight of another vinyl monomer.

3. The composition of claims 1 or 2 wherein the polyester resin (A) has a number average molecular weight of 1,000 to 10,000.

4. The composition of any one of claims 1 or 2 wherein the glycidyl-containing acrylic polymer (B) has a number average molecular weight of 300 to 5,000.

5. The composition of any one of claims 1 or 2 which further comprises 0.5 to 20 parts by weight, per 100 parts by weight of the polyester resin (A) and the acrylic polymer (B) combined, of at least one compound selected from the group consisting of (C) aliphatic dibasic acids, (D) polyepoxy resins, and (E) carboxyl-containing vinyl polymers.

6. The composition of claim 1 wherein the polyester rein (A) has an acid value of 20 to 70 mgKOH/g and a softening point of 100° to 130° C.

7. The composition of claim 1 which consists essentially of 70 to 90% by weight of the polyester resin and 10 to 30% by weight of the glycidyl-containing acrylic polymer.

8. The composition of claim 1 wherein the average number of carboxyl groups per molecule of the polyester resin (A) is from 1.2 to 3.0.

9. The composition of claim 2 wherein the glycidyl-containing acrylic polymer (B) is a copolymer of from 40 to 80% by weight of said at least one compound and 20 to 60% by weight of another vinyl monomer selected from the group consisting of styrene, methacrylic acid esters, acrylic acid esters, fumaric acid diesters, acrylonitrile and acrylamide.

10. The composition of claim 9 wherein the other vinyl monomer comprises at least 50% by weight of methyl methacrylate or Cellosolve methacrylate.

11. The composition of claim 2 wherein the glycidyl-containing acrylic polymer (B) is obtained from 20 to 99% by weight of said at least one compound, 0 to 60% by weight of another vinyl monomer and 1 to 20% by weight of a monobasic acid.

12. The composition of claim 11 wherein the glycidyl-containing acrylic polymer (B) is obtained from 40 to 78% by weight of said at least one compound, 20 to 50% by weight of another vinyl monomer and 2 to 10% by weight of said monobasic acid.

13. The composition of claim 1 which further comprises 0.5 to 20 parts by weight, per 100 parts of the combined weight of the polyester resin (A) and the acrylic polymer (B) of (C) an aliphatic dibasic acid of the formula HOOC—R—COOH wherein R represents a linear or branched alkylene group having 1 to 20 carbon atoms.

14. The composition of claim 1 which further comprises 0.5 to 20 parts by weight, per 100 parts of the combined weight of the polyester resin (A) and the acrylic polymer (B) of (D) a polyepoxy resin having at least two epoxy groups per molecule and an epoxy equivalent of 80 to 2,000 and a number average molecular weight of 300 to 5,000.

15. The composition of claim 1 which further comprises 0.5 to 20 parts by weight, per 100 parts of the combined weight of the polyester resin (A) and the acrylic polymer (B) of (E) a carboxyl-containing vinyl polymer having an acid value of 10 to 20 mgKOH/g, and a number average molecular weight of 300 to 10,000.

* * * * *